US012120716B1

(12) United States Patent
Saulnier et al.

(10) Patent No.: US 12,120,716 B1
(45) Date of Patent: Oct. 15, 2024

(54) INITIATING WIDEBAND SIMULTANEOUS TRANSMIT AND RECEIVE COMMUNICATIONS

(71) Applicant: Resonant Sciences, LLC, Dayton, OH (US)

(72) Inventors: Al Saulnier, Laura, OH (US); Randall T Clark, Xenia, OH (US); Jeremy Micah North, Dayton, OH (US); Doug Sicker, Louisville, CO (US)

(73) Assignee: Resonant Sciences, LLC, Dayton, OH (US)

( * ) Notice: Subject to any disclaimer, the term of this patent is extended or adjusted under 35 U.S.C. 154(b) by 108 days.

(21) Appl. No.: 17/358,939

(22) Filed: Jun. 25, 2021

Related U.S. Application Data

(60) Provisional application No. 63/044,396, filed on Jun. 26, 2020.

(51) Int. Cl.
*H04W 74/06* (2009.01)
*H04L 5/00* (2006.01)
(Continued)

(52) U.S. Cl.
CPC ......... *H04W 72/541* (2023.01); *H04L 5/0073* (2013.01); *H04L 5/14* (2013.01);
(Continued)

(58) Field of Classification Search
CPC ..... H04W 72/04; H04W 88/08; H04W 76/00; H04W 72/082; H04W 74/06;
(Continued)

(56) References Cited

U.S. PATENT DOCUMENTS

| 4,035,734 A | * | 7/1977 | Flormann | H04B 15/00 327/552 |
| 4,327,438 A | * | 4/1982 | Baier | H04B 1/707 375/150 |

(Continued)

FOREIGN PATENT DOCUMENTS

| EP | 2868004 B1 | 2/2018 |
| WO | 2013062547 A1 | 5/2013 |

OTHER PUBLICATIONS

U.S. Appl. No. 17/358,997, filed Jun. 25, 2021, Al Saulnier.
(Continued)

*Primary Examiner* — Hassan A Phillips
*Assistant Examiner* — Prenell P Jones
(74) *Attorney, Agent, or Firm* — Christopher M. Ramsey; GrayRobinson, P.A.

(57) ABSTRACT

A protocol for initiating communications between STAR devices in a network includes communicating via a communication device having a transmit signal path and a receive signal path where the transmit signal path and receive signal path are operable to transmit and receive simultaneously at the same frequency over an interference-suppressed band. A communication sub-band and an initiation sub-band are generated within the interference-suppressed band. The initiation sub-band has a lower bandwidth than the communication sub-band. Signals may be transmitted and received signals over the initiation sub-band the communication sub-band.

8 Claims, 6 Drawing Sheets

(51) Int. Cl.
*H04L 5/14* (2006.01)
*H04W 12/06* (2021.01)
*H04W 72/0453* (2023.01)
*H04W 72/541* (2023.01)

(52) U.S. Cl.
CPC ....... *H04W 12/06* (2013.01); *H04W 72/0453* (2013.01); *H04W 74/06* (2013.01)

(58) Field of Classification Search
CPC .... H04W 12/06; H04W 72/0453; H04L 5/14; H04L 5/0073
See application file for complete search history.

(56) References Cited

U.S. PATENT DOCUMENTS

| | | | |
|---|---|---|---|
| 4,475,246 A | 10/1984 | Batlivala et al. | |
| 5,481,572 A * | 1/1996 | Skold | H04L 1/02 714/796 |
| 5,912,644 A * | 6/1999 | Wang | G01S 5/14 375/130 |
| 5,963,847 A * | 10/1999 | Ito | H04B 1/525 455/24 |
| 6,912,644 B1 * | 6/2005 | O'Connor | G06F 12/1027 711/E12.061 |
| 7,555,219 B2 | 6/2009 | Cox et al. | |
| 7,633,435 B2 | 12/2009 | Meharry et al. | |
| 7,756,002 B2 | 7/2010 | Batra et al. | |
| 8,135,339 B2 | 3/2012 | Ranson et al. | |
| 8,285,201 B2 | 10/2012 | Gore et al. | |
| 8,503,926 B2 | 8/2013 | Gainey et al. | |
| 8,571,470 B2 | 10/2013 | Ranson et al. | |
| 8,630,211 B2 | 1/2014 | Gainey et al. | |
| 8,725,067 B2 | 5/2014 | Ahn et al. | |
| 8,755,750 B2 | 6/2014 | Cox et al. | |
| 8,868,006 B2 | 10/2014 | Cox et al. | |
| 8,879,433 B2 | 11/2014 | Khojastepour et al. | |
| 9,209,840 B2 | 12/2015 | Cox | |
| 9,461,698 B2 | 10/2016 | Moffatt et al. | |
| 10,218,490 B1 | 2/2019 | Yang et al. | |
| 11,057,067 B1 * | 7/2021 | Hickle | H04B 1/109 |
| 11,121,473 B2 | 9/2021 | Chapman et al. | |
| 11,362,694 B1 * | 6/2022 | Laufer | H04B 1/123 |
| 11,405,171 B2 | 8/2022 | Khude et al. | |
| 2001/0029186 A1 * | 10/2001 | Canyon | H04M 1/725 455/462 |
| 2004/0032904 A1 | 2/2004 | Orlik et al. | |
| 2006/0251148 A1 | 11/2006 | Welborn et al. | |
| 2009/0175365 A1 * | 7/2009 | Jun | H04L 27/2626 375/295 |
| 2011/0007852 A1 * | 1/2011 | Kimata | H04L 25/067 375/341 |
| 2011/0170473 A1 | 7/2011 | Proctor, Jr. et al. | |
| 2011/0286605 A1 | 11/2011 | Furuta et al. | |
| 2012/0170482 A1 | 7/2012 | Hwang et al. | |
| 2012/0213312 A1 * | 8/2012 | Futatsugi | H04L 27/26265 375/296 |
| 2013/0244710 A1 * | 9/2013 | Nguyen | G01S 13/90 455/501 |
| 2013/0314271 A1 * | 11/2013 | Braswell | G01S 7/352 342/175 |
| 2014/0194054 A1 | 7/2014 | Kim | |
| 2014/0204808 A1 * | 7/2014 | Choi | H04L 5/1461 370/278 |
| 2015/0269449 A1 * | 9/2015 | Kosaki | H04N 5/28 382/103 |
| 2015/0270865 A1 * | 9/2015 | Polydoros | H04B 1/62 375/346 |
| 2015/0326380 A1 * | 11/2015 | Verbin | H04L 5/0037 370/252 |
| 2016/0254007 A1 * | 9/2016 | Guo | H03G 5/005 704/226 |
| 2017/0257868 A1 | 9/2017 | Wang et al. | |
| 2017/0280351 A1 | 9/2017 | Skaaksrud | |
| 2018/0076847 A1 | 3/2018 | Ju et al. | |
| 2019/0097707 A1 * | 3/2019 | Cox | H04B 7/0626 |
| 2019/0200396 A1 * | 6/2019 | Agiwal | H04W 72/23 |
| 2019/0207738 A1 * | 7/2019 | Son | H04L 5/14 |
| 2019/0274030 A1 * | 9/2019 | Bidot | H04W 12/08 |
| 2019/0310681 A1 * | 10/2019 | Shainwald | A61B 17/3417 |
| 2020/0053835 A1 * | 2/2020 | Ye | H04L 1/0003 |
| 2020/0099504 A1 * | 3/2020 | Erricolo | H03H 11/28 |
| 2020/0153500 A1 * | 5/2020 | Kim | H04W 56/0065 |
| 2020/0245363 A1 | 7/2020 | Kim et al. | |
| 2020/0252115 A1 | 8/2020 | Paramesh et al. | |
| 2020/0252806 A1 * | 8/2020 | Yerramalli | H04B 7/0617 |
| 2021/0028897 A1 * | 1/2021 | Park | H04L 5/0044 |
| 2021/0273773 A1 * | 9/2021 | Yi | H04L 5/1461 |
| 2021/0274381 A1 * | 9/2021 | Teyeb | H04W 80/02 |
| 2021/0377912 A1 * | 12/2021 | El Hamss | H04L 1/1819 |
| 2022/0094512 A1 * | 3/2022 | Kolodziej | H04B 1/1081 |
| 2022/0095268 A1 * | 3/2022 | Oh | H04L 5/0051 |
| 2022/0150730 A1 * | 5/2022 | Freda | H04L 1/188 |
| 2022/0159674 A1 * | 5/2022 | Deng | H04L 5/0053 |

OTHER PUBLICATIONS

Carusone et al.; "Analogue Adoptive Filters: Past and Present"; IEE Proc., Circuits Devices System; vol. 147, No. 1; Feb. 2000.

Nawankwo et al.; "A Survey of Self-Interference Management Techniques for Single Frequency Full Duplex Systems"; IEEE Access; vol. 6; pp. 30242-30268; 2018.

Office Action of Oct. 28, 2022 for U.S. Appl. No. 17/358,997.

Office Action of Sep. 7, 2023 for U.S. Appl. No. 17/358,997.

* cited by examiner

INITIATING WIDEBAND SIMULTANEOUS TRANSMIT AND RECEIVE COMMUNICATIONS

CROSS-REFERENCE TO RELATED APPLICATION

This claims the benefit of priority to Application No. 63/044,396, filed Jun. 26, 2020, which is incorporated by reference in its entirety.

FIELD

This relates to the field of communications and, more particularly, to communications between simultaneous transmit and receive (STAR) devices.

BACKGROUND

Communication devices communicate with each other over a frequency band in the radio or microwave frequency range. To prevent interference between devices, government agencies regulate the frequency bands that are available. Unfortunately, because frequency bandwidth is set by the laws of physics, new bandwidth cannot be created. To overcome this obstacle, people have learned to use frequency bands efficiently. But, because the demand for wireless communication and the amount of data being transmitted is increasing, there is a need to increase the number of users assigned to a particular band.

Radio communications take place on a prescribed band or channel within the spectrum. In order for data to be transmitted and received by radio devices, the channel is often divided into a transmission band and receiving band, which requires more bandwidth than would be required if the data could be transmitted and received over the same band simultaneously.

In recent years, people have developed wireless devices, called STAR devices, that can simultaneously transmit and receive at same frequency. If these STAR devices could be used in modern communication networks, such as radio or cellular networks, they would free significant amounts of bandwidth. STAR devices have, however, found limited commercial use because they are usually narrowband and made for specialized purposes.

BRIEF SUMMARY

It would be beneficial to find a way to use STAR devices in modern communication networks to free bandwidth that could be used for other purposes. The devices, methods, and systems described here permit such use of STAR devices and set forth an advantageous protocol for initiating wideband simultaneous transmit and receive communications.

An example of a communication device includes a transmit signal path and a receive signal path. The transmit signal path and receive signal path are operable to transmit and receive simultaneously at the same frequency over an interference-suppressed band. Processing circuitry is configured to generate a communication sub-band and an initiation sub-band within the interference-suppressed band. The initiation sub-band has a lower bandwidth than the communication sub-band. The processing circuitry is also configured to transmit and receive over the initiation sub-band and transmit and receive over the communication sub-band.

The communication device may further include one or more of the following features.

The communication device may further include an interference suppressor that suppresses interference between the transmit signal path and receive signal path to form the interference-suppressed band.

The initiation sub-band may operate at a lower power than the communications sub-band.

The communication sub-band may be at least 75% of the bandwidth of the interference-suppressed band.

The initiation sub-band may include a first frequency range higher than the communication sub-band and a second frequency range lower than the communication sub-band.

The processing circuitry may be further configured to transmit a polling signal and receive a remote polling signal simultaneously at the same frequency in the initiation sub-band.

The processing circuitry may be configured to transmit and receive over the communication sub-band simultaneously at the same frequency.

The signals transmitted in the initiation sub-band may be lower power than a baseline power of the communication sub-band.

An example of a communication method includes communicating via a communication device having a transmit signal path and a receive signal path where the transmit signal path and receive signal path are operable to transmit and receive simultaneously at the same frequency over an interference-suppressed band. The method includes generating a communication sub-band and an initiation sub-band within the interference-suppressed band where the initiation sub-band has a lower bandwidth than the communication sub-band. The method also includes transmitting and receiving signals over the initiation sub-band and transmitting and receiving signals over the communication sub-band.

This communication method may further include one or more of the following features.

The communication may further include forming the interference-suppressed band by suppressing interference between the transmit signal path and receive signal path.

The initiation sub-band may operate at a lower power than the communications sub-band.

The communication sub-band may be at least 75% of the bandwidth of the interference-suppressed band.

The initiation sub-band may include a first frequency range higher than the communication sub-band and a second frequency range lower than the communication sub-band.

The communication method may further include transmitting a polling signal and receiving a remote polling signal simultaneously at the same frequency in the initiation sub-band.

The processing circuitry may be configured to transmit and receive over the communication sub-band simultaneously at the same frequency.

Signals transmitted in the initiation sub-band may be lower power than a baseline power of the communication sub-band.

Another example of a communication method includes facilitating a communication network between a plurality of communication devices having a transmit signal path and a receive signal path, where the transmit signal path and receive signal path are operable to simultaneously transmit and receive at the same frequency over an interference-suppressed band, by (a) generating a communication sub-band and an initiation sub-band within the interference-suppressed band where the initiation sub-band has a lower bandwidth than the communication sub-band; (b) executing a polling stage in which a first communication device transmits a polling signal within the initiation sub-band to a second communication device; (c) executing an interrogation stage in which the first communication device transmits an interrogation signal within the initiation sub-band to the second communication device; (d) executing an authenticating stage in which the first communication device transmits a timing signal to the second communication device; and (e) executing a communication stage based on the timing signal in which the first and second communication devices communicate by transmitting and receiving simultaneously at the same frequency.

This communication method may further include one or more of the following features.

The interference-suppressed band may be formed by suppressing interference between the transmit signal path and receive signal path.

The initiation sub-band may operate at a lower power than the communications sub-band.

The communication sub-band may be at least 75% of the bandwidth of the interference-suppressed band.

The initiation sub-band may include a first frequency range higher than the communication sub-band and a second frequency range lower than the communication sub-band.

The communication method may further include, simultaneously at the same frequency in the initiation sub-band, transmitting a polling signal by the first communication device and receiving by the first communication device a polling signal from the second communication device.

The processing circuitry may be configured to transmit and receive over the communication sub-band simultaneously at the same frequency.

Signals transmitted in the initiation sub-band may be lower power than a baseline power of the communication sub-band.

DETAILED DESCRIPTION OF EXAMPLE EMBODIMENTS

This disclosure describes exemplary embodiments, but not all possible embodiments of the devices, systems and methods. Where a particular feature is disclosed in the context of a particular example, that feature can also be used, to the extent possible, in combination with and/or in the context of other examples. The devices, systems, and methods may be embodied in many different forms and should not be construed as limited to only the examples described here.

Figure 1:
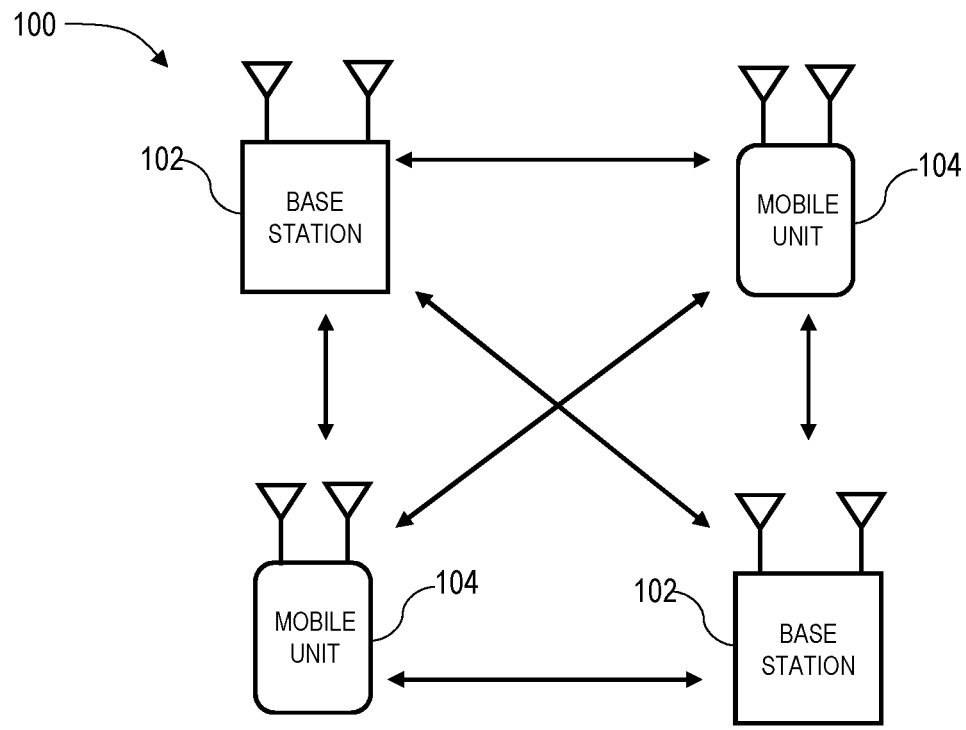
FIG. 1 is a block diagram of an example of a communication network.

Referring to FIG. 1, a communications network 100 may include at least one base station 102 that communicates with at least one mobile unit 104. The base station 102 is a fixed-location point of communication for devices within the network. The base station 102 receives and transmits signals in the network to devices such as mobile units 104.

A mobile unit 104 may be a mobile communication device such as cellular phone, tablet, computer, radio, and the like. The mobile unit 104 may include the typical hardware and software components one would find in modern mobile communication devices, such as a processor, memory, a keypad, a screen, and I/O ports, among others. In any example, the mobile unit 104 is a device capable of receiving and transmitting radio frequency signals wirelessly.

In the communications network, the base station 102 may communicate with the mobile units 104 and mobile units 104 may communicate with other mobile units 104 and base stations 102 as illustrated by the arrows in FIG. 1.

The network may be a wired or wireless network that operates using radio frequency communications technology such as a radio network, cellular network, computer network, Internet network, or the like.

Figure 2:
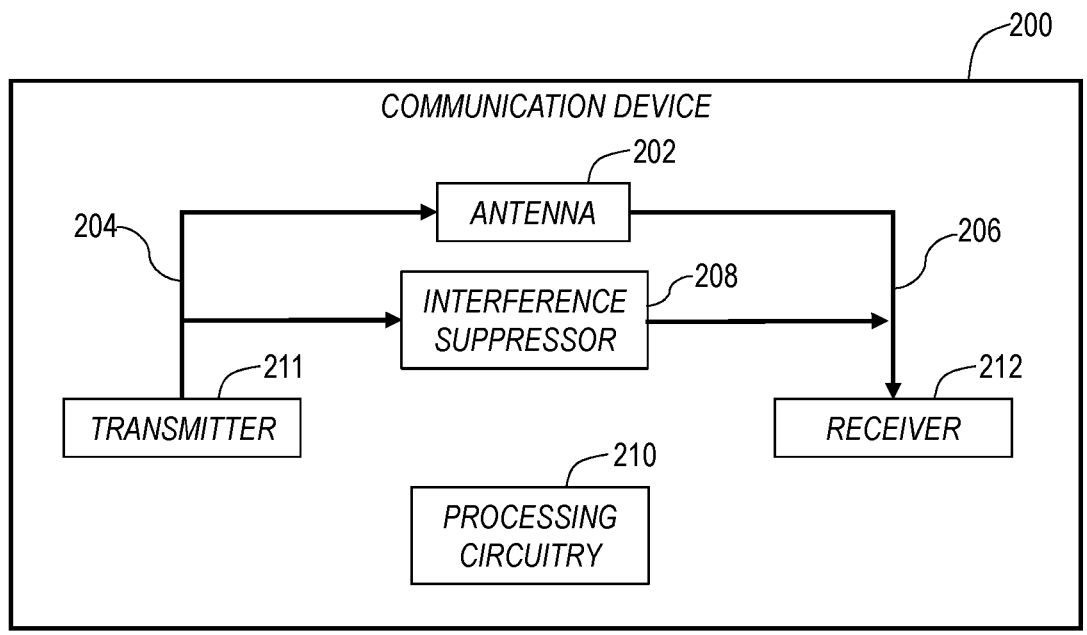
FIG. 2 is a block diagram of an example of a communication device.

Referring to FIG. 2, an example of communication device 200 useful in such a communication network 100 and other types of communication networks will now be described.

The communication device 200 includes at least one antenna 202 in signal communication with a transmit signal path 204 and a receive signal path 206. The communication device 200 also includes an interference suppressor 208 and processing circuitry 210. In the communication network 100, the base stations 102 and mobile units 104 may be equipped with a communication device 200 described here.

The antenna 202 may be a radio antenna capable of transmitting and receiving radio signals. Conventional antennae may be used to serve this purpose. In some examples of the communication device 200, a single antenna can perform the transmit and receive functions of the communication device 200. In other examples, the antenna 202 may be composed of a separate transmit antenna and a receive antenna, or an antenna array with multiple apertures.

The transmit signal path 204 and receive signal path 206 are signal propagation pathways through which a transmitted signal and a received signal travels, respectively. These pathways may include conventional coaxial lines, waveguides, directional couplers, and signal conditioning equipment. The transmitted signal may be generated by a radio transmitter 211, travel through the transmitted signal path 204, and be transmitted from the antenna 202. The received signal may be received by the antenna 202, travel through the receive signal path 206, and be received by a radio receiver 212.

The transmit signal path 204 and receive signal path 206 are operable simultaneously at the same frequency. This permits them to transmit and receive at the same frequency at the same time so that the communication device 200 is a STAR device. In a conventional radio, this is not possible because the receive signal path 204 will receive interference from the signal being transmitted via the transmit signal path 204.

The components of the communication device 200 may vary depending on its purpose. Those skilled in the art will understand how to make the communication device 200 and/or modify an existing conventional device to transform it into a communication device 200 after having the benefit of reading this disclosure.

To permit simultaneous transmission and reception at the same frequency, the interference suppressor 208 is operable to cancel interference noise from the transmit signal path 204 in the receive signal path 206 over a interference-suppressed band. This effectively reduces same frequency interference between the transmit signal path 204 and receive signal path 206 so that the receiver 212 can hear the desired transmission from a different communication device 200 rather than interference from the same communication device's 200 transmitted signal.

As used herein, "noise" refers to the background signal at the receiver 212 at the frequency range of interest prior to interference suppression. Interference suppression reduces the noise by suppressing interference caused by a signal being transmitted at the same time and same frequency as a signal that is being received.

Interference suppressors 208 useful for simultaneous transmit and receive devices are known and may be used as the interference suppressor 208 discussed here. Examples of such interference suppressors are described by Nwankwo et al in "A Survey of Self-Interference Management Techniques for Single Frequency Full Duplex Systems," *IEEE Access*, Vol. 6, pp. 30242-30268 (2018). Other examples of interference suppressors 208 that may be used in the communication device 200 are disclosed in U.S. Pat. Nos. 7,633,435, 8,879,433, 9,209,840, 9,461,698, 9,692,469, 10,218,490, and EP 2868004. The type of communication device 200 and interference suppressor 208 giving it STAR capability is not limited to any particular STAR device. Conventional STAR devices may be used and adapted to function with the network 100 using the initiation protocol described herein.

The problem with using simultaneous transmit and receive communication devices in a network is that no protocol is currently in place for initiating a communication between communication devices 200 operating in the network 100 as there would be with conventional radio communication devices in a cellular network, for example. The processing circuitry 210 is configured to provide this function.

Figure 3:
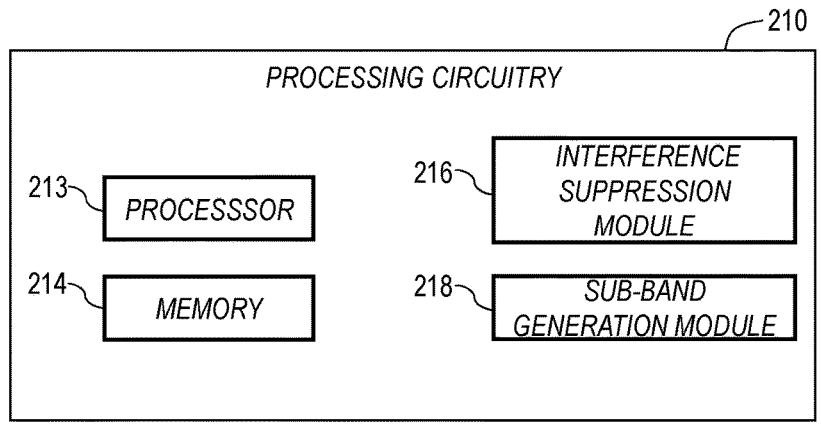
FIG. 3 is a block diagram of an example of processing circuitry.

Referring to FIG. 3, the processing circuitry 210 includes a computer processor 213 and machine readable memory 214 that stores program instructions executed by the processor 213.

Figure 4:
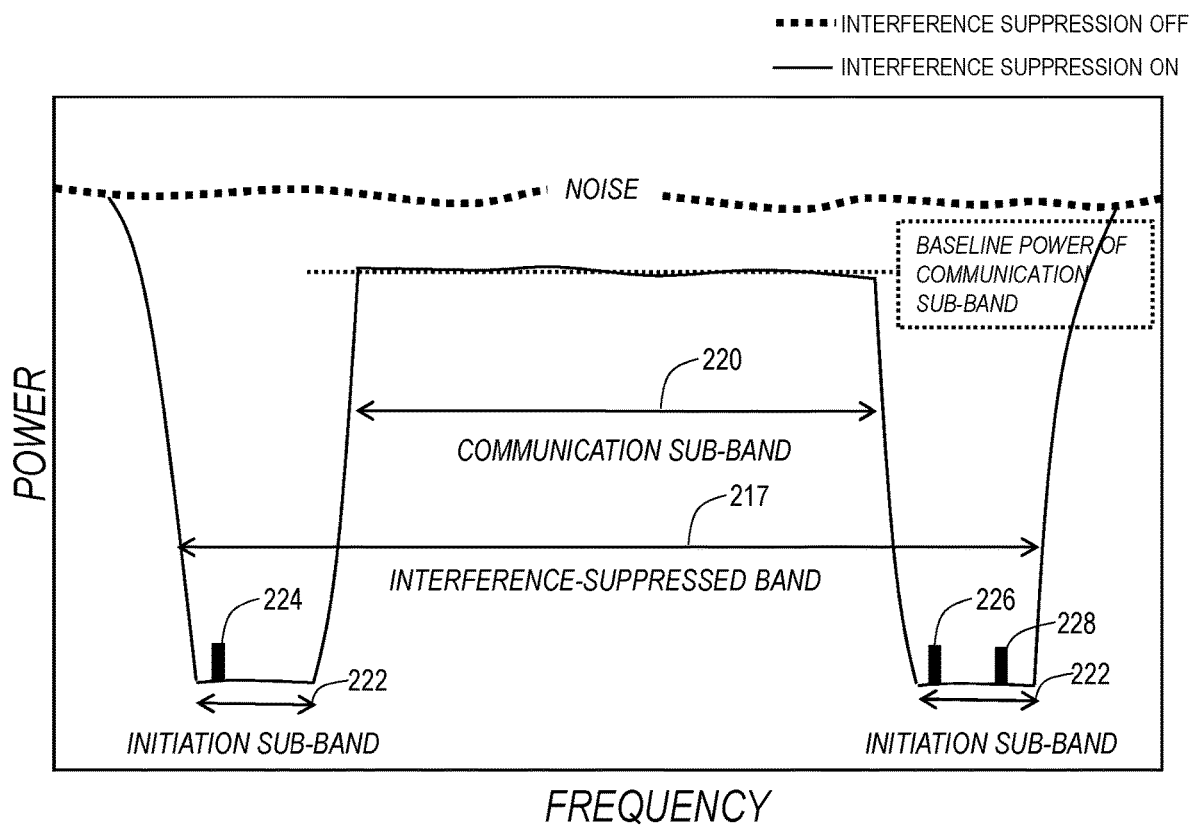
FIG. 4 is a graph illustrating different bands and sub-bands for communication in the network.

Referring to FIGS. 2-4, the processing circuitry 210 is configured to generate a communication sub-band 220 and an initiation sub-band 222 within the interference-suppressed band 217. The initiation sub-band 222 may have a lower bandwidth than the communication sub-band 220 and may operate at a lower power than the communication sub-band 220. As illustrated in FIG. 4, the interference suppression relative to the background noise, labeled in FIG. 4, over the initiation sub-band 222 may be greater than the interference suppression relative to the background noise over the communication sub-band 220. The power at which the initiation sub-band 222 and communication sub-band 220 operate is within the background noise power, which makes communications less detectable by third parties.

The processing circuitry 210 is also configured to transmit and receive over the initiation sub-band 224 and transmit and receive simultaneously at the same frequency over the communication sub-band 220 as described below.

As illustrated in FIG. 4, the interference-suppressed band 217 is the band or frequency range over which the interference suppressor 208 and interference suppression module 216 operate. In a specific example, the interference suppressor 208 operates over an instantaneous bandwidth of up to 1 GHz over the 3 MHz to 60 GHz range.

Referring to FIGS. 3 and 4, an interference suppression module 216 includes program instructions that define the interference-suppressed band 217, which is the band over which the interference suppressor 208 operates. For example, if the interference suppressor 208 operates over a range of 1 GHZ, the interference-suppressed band is the 1 GHz range in which the interference suppressor 208 cancels interference from the transmit signal path 204 in the receive signal path 206.

A sub-band generation module 218 generates a communication sub-band 220 and an initiation sub-band 222 within the interference-suppressed band 217.

The initiation sub-band 222 has a lower bandwidth than the communication sub-band 220 and may operate at a lower power than the communication sub-band 220. The bandwidth of the communication sub-band 220 is at least 75% of the bandwidth of the interference-suppressed band 217.

The initiation sub-band 222 may be distributed over two separate bands within the interference-suppressed band 217. The initiation sub-band 222 may include a first frequency range that is higher than the communication sub-band 220 and a second frequency range that is lower than the communication sub-band 220.

The communication sub-band 220 may operate at a lower power than the noise over the interference-suppressed band 217. This function makes communications within the communication sub-band 220 extremely difficult to detect for conventional radio devices, thereby permitting secure communications.

The initiation sub-band 222 may be used by the processing circuitry 210 for transmitting a polling signal 224 to other communication devices 200 in the network 100. The polling signal 224 informs the other communication devices 200 that the communication device transmitting the polling signal 224 desires to transmit/receive data to/from another communication device 200 via the communication sub-band 220.

The polling signal 224 may have many different forms including one or more pulses of a pre-defined power, duration, sequence, and delay time between pulses in a sequence, and modulation schemes. If desired, each communication device 200 may have its own unique polling signal 224, that functions like an identification of that particular communications device 200. Because the polling signal 224 is transmitted in the initiation sub-band 222, it can have lower power but still be detectable by the other communication devices 200. The polling signal 224 may be relatively low power, such as being about 10% power above the noise floor of the frequency the polling signal 224 occupies.

The second communication device 200 that receives the polling signal 224 may transmit its own polling signal 224 at the same frequency at the same time as the first communication device 200. The communication devices 200 in the network 100 are able to simultaneously transmit their own polling signals 224 and receive polling signals 224 from other communication devices 200 at the same time and at the same frequency.

The initiation sub-band 222 may be also used by the processing circuitry 210 for transmitting an interrogation signal 226 to another communication devices 200 in the network that acknowledged receiving the polling signal 224. The interrogation signal 226 is the second stage of initiating communications over the communication sub-band 220. The interrogation signal 226 may be relatively low power, such as being about 10% power above the noise floor of the frequency the interrogation signal 226 occupies.

The interrogation signal 226 tells communication devices 200 communicating within the network 100 after having exchanged polling signals 224 that each of the communication devices 200 is permitted to communicate within the network 100.

The interrogation signal 226 may have many different forms including one or more pulses of a pre-defined power, duration, sequence, and delay time between pulses in a sequence, and modulation schemes. If desired, each communication device 200 may have its own unique interrogation signal 226, that further identifies that particular communications device 200 beyond the polling signal 224. Because the interrogation signal 226 is transmitted in the initiation sub-band 222, it can have lower power but still be detectable by the other communication devices 200.

The interrogation signal 226 may be transmitted at a different frequency than the polling signal 224. The communication devices 200 in the network 100 are able to simultaneously transmit their own interrogation signals 226 and receive interrogation signals 226 from other communication devices 200 at the same time and at the same frequency.

After two communication devices 200 have exchanged interrogation signals 226, they are able to confirm each is permitted to communicate within the network 100, the initiation sub-band 222 may be also used by the processing circuitry 210 for transmitting an authentication signal 228 to the other communication device 200.

The authentication signal 228 allows each communication device 200 to identify the communication device 200 attempting to communicate with it. This may be accomplished by each communication device 200 having stored thereon the unique authentication signal 228 of each communication device 200 authorized to use the network 100.

The authentication signal 228 may have many different forms including one or more pulses of a pre-defined power, duration, sequence, and delay time between pulses in a sequence, and modulation schemes. Because the authentication signal 228 is transmitted in the initiation sub-band, it can have lower power but still be detectable by the other communication devices 200.

The authentication signal 228 synchronizes the communication devices 200 so that they are operating at substantially the same time scale. The processing circuitry 210 generates a timer that defines the time the communication devices 200 will be able to communicate over the communication sub-band 220. The timer may set a countdown time defined by a timing source. The timing source may be an internal clock or an external clock such as a Global Positioning System time clock.

The authentication signal 228 may be transmitted at a different frequency than the polling signal 224 or interrogation signal 226. The communication devices 200 in the network 100 are able to simultaneously transmit their own authentication signals 228 and receive authentication signals 228 from other communication devices 200 at the same time and at the same frequency.

Once the countdown timer ends, both communication devices 200 are able to transmit and receive data over the wideband communication sub-band 220. Because both devices are able to transmit and receive at the same frequency, the communication sub-band 220 allows for full duplex communication at the same frequency. Unlike conventional radio networks, it is not necessary to divide the communication sub-band 220 into separate transmit and receive bands. It is also not necessary to use guard bands.

Figure 5:
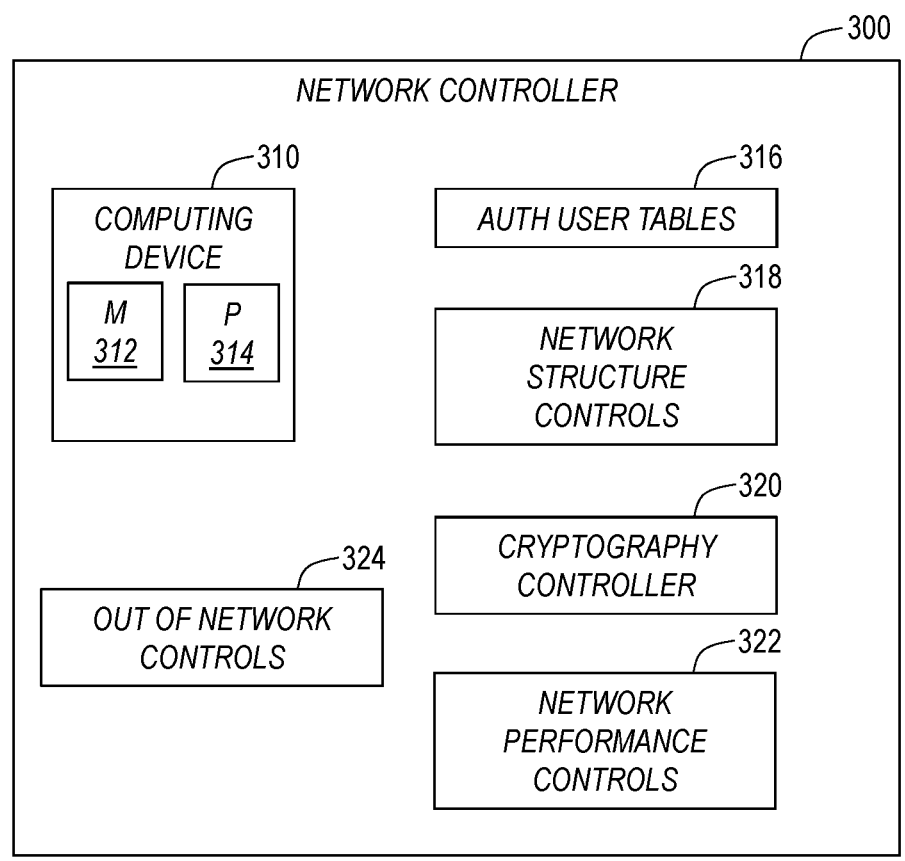
FIG. 5 is a block diagram of an example of a network controller.

Referring to FIG. 5, the communication devices 200 in the network 100 are in communication with a network controller 300. The network controller includes a computing device 310 having machine readable memory 312 storing program instructions that a computer processor 314 executes to perform control operations on the network 100. The network controller 300 may be a dedicated device physically separate from any of the communication devices 200 or it may be part of one or more of the communication devices 200.

The memory 312 stores authorized user tables 316. The authorized user tables 316 include a list of the communication devices 200 that are authorized to communicate over the network 100. It may also store the polling signal 224 and interrogation signal 226 unique to each communication device 200 so that they can be used to identify a particular communication device 200.

The memory 312 stores network structure controls 318. The network structure controls 318 may include the network spectrum definition, channel loading protocols, Delay or Disruption Tolerant Network (DTN) protocols and priority, and Software Defined Radio (SDR) and Software Defined Networking (SDN) protocols for the network 100.

The memory 312 stores a cryptography controller 320. The cryptography controller includes program instructions to assign frequency key codes and perform over the air re-keying of the communication devices 200.

The memory 312 stores network performance controls 322. The network performance controls 322 includes program instructions to monitor network performance and perform network optimization routines. The network performance controls 322 also include program instructions executed by the communication devices 200 for operating the interference suppression module 216 and sub-band generation module 218.

The memory 312 stores out of network controls 324. The out of network controls 324 include program instructions for handling communications from devices that are not capable of simultaneously transmitting and receiving at the same frequency.

The network controller 300 is in communication with the communication devices 200. Network control functions may be synchronized over similar or dissimilar networks via secure messaging. In this case, being synchronized means the network controller 300 shares its data and functions with communications devices 200 across the network.

Figure 6:
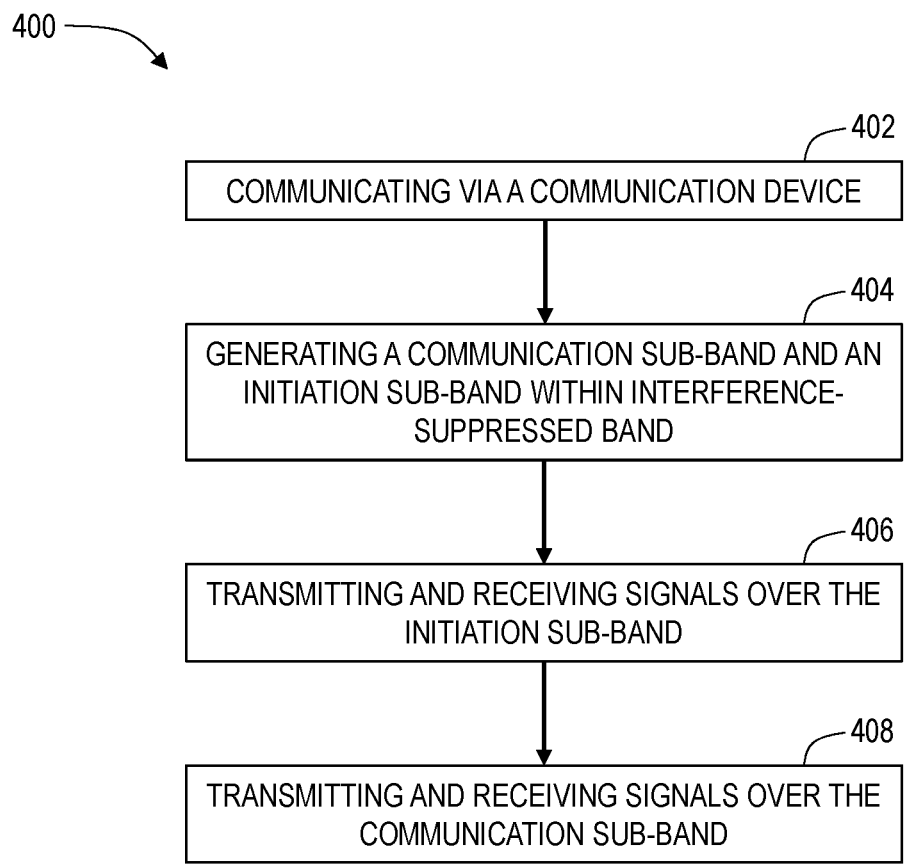
FIG. 6 is a flow diagram of an example of a communication method.

Referring to FIG. 6, an example of communication method 400 that may employ any of the aforementioned features is now described.

At block 402, the method 400 includes communicating via a communication device, such as communication device 200 having a transmit signal path 204 and a receive signal path 206. The transmit signal path 204 and receive signal path 206 are operable to transmit and receive simultaneously at the same frequency over the interference-suppressed band 217.

At block 404, the method 400 further includes generating a communication sub-band 220 and an initiation sub-band 224 within the interference-suppressed band 217. The initiation sub-band 224 has a lower bandwidth than the communication sub-band 220.

At block 406, the method 400 further includes transmitting and receiving signals over the initiation sub-band 224. This may be achieved as described above.

At block 408, the method 400 further includes transmitting and receiving signals over the communication sub-band 220. Communication may be achieved over the initiation sub-band 224 and communication sub-band 220 between different communication devices 200 simultaneously and at the same frequency.

Figure 7:
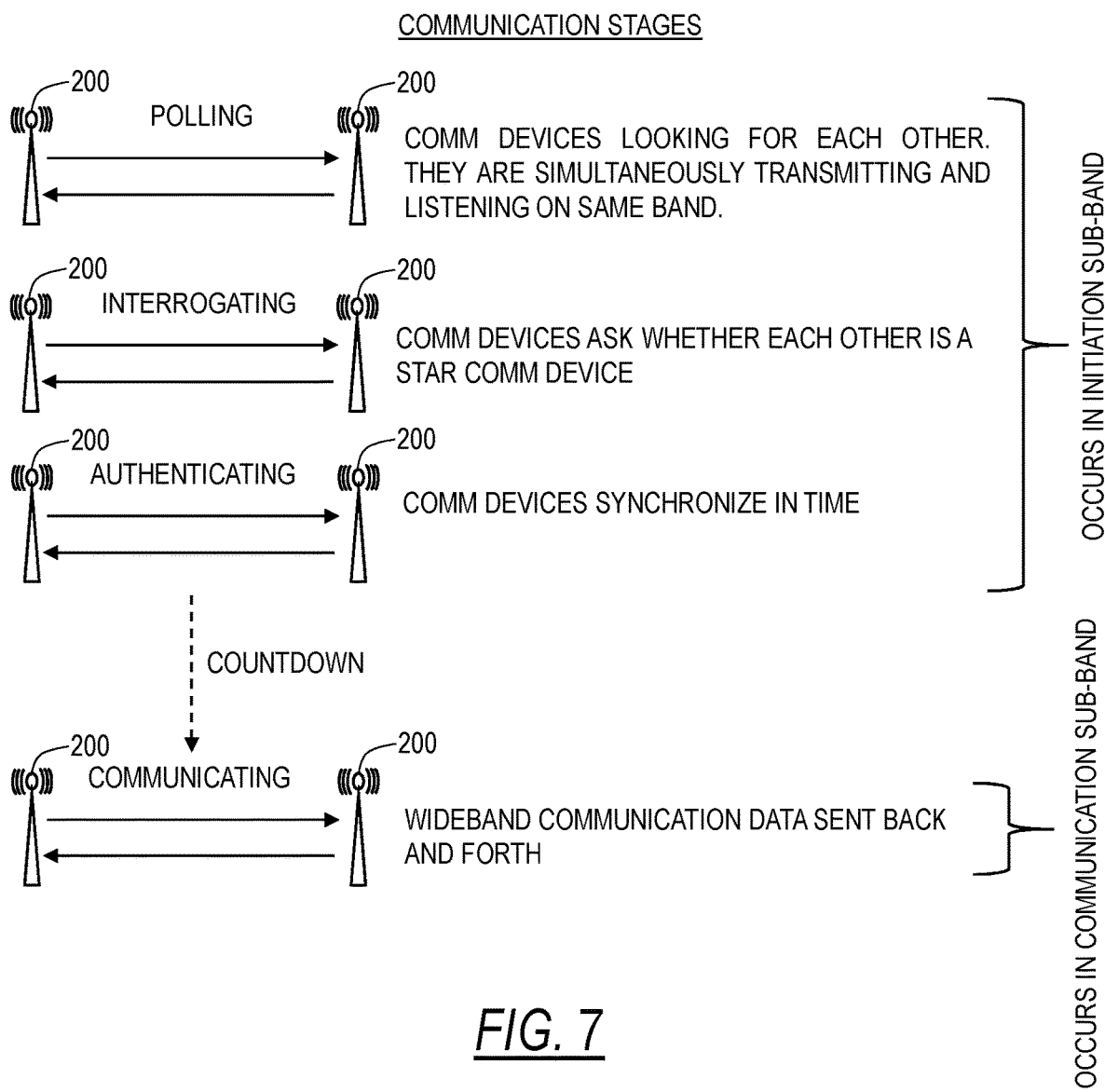
FIG. 7 is a flow diagram of another communication method.

Referring to FIG. 7, another example of a communication method is described in terms of exemplary stages of initiating data communication between communication devices 200 in the network 100. These stages are executed by the communication devices 200 using program instructions executed by their processing circuitry 210.

In the polling stage, communication devices 200 are transmitting their respective polling signals 224, effectively looking for another communication device 200 with which to communicate. The polling signals 224 may be transmitted and received simultaneously at the same frequency.

In the interrogating stage, subsequent to the polling stage, the communication devices 200 exchange their respective interrogation signals 226, which may be transmitted and received simultaneously at the same frequency. During the interrogating stage, the communication devices 200, are able to confirm whether the other communication device 200 is capable of simultaneous transmission and reception (STAR) at the transmitted and received simultaneously at the same frequency.

In the authenticating stage, subsequent to the interrogating stage, the communication devices 200 transmit and receive their respective authentication signals 228, which may be transmitted and received simultaneously at the same frequency. During this stage, the communication devices 200 become time synchronized and the timing countdown begins.

After the timing countdown ends, the communicating stage commences. During the communication stage, the communication devices 200 transmit and receive data between each other over the communication sub-band 220. During this stage, large amount of data may be exchanged because the communication sub-band 220 has a large bandwidth. During the communication stage, the communication devices 200 may transmit and receive data simultaneously at the same frequency.

Figure 8:
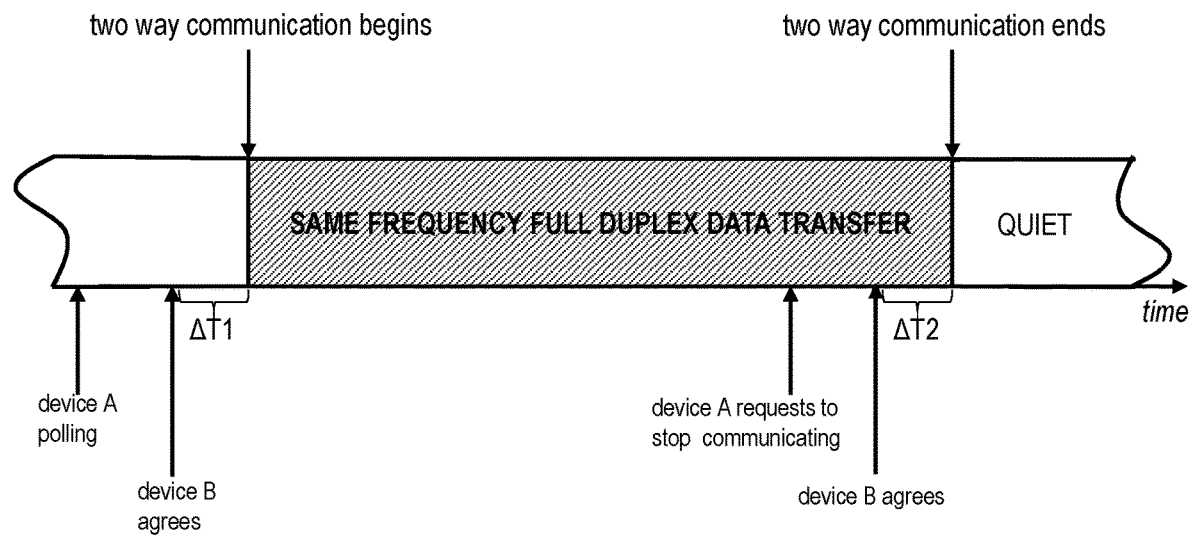
FIG. 8 is a time-based summary of the timeline of initiating and making communications in the network.

Referring to FIG. 8, parts of the communication stages are summarized as a function of time. Beginning at the earlier time on the left, communication device A 200 enters the polling stage and begins searching for another communication device B 200 with which to communicate. After the interrogation stage, communication device B 200 agrees to communicate with communication device A 200. During the authentication stage, the countdown, represented by ΔT1 begins. At the end of the countdown, two way full duplex same frequency data communications begin on the communication sub-band 220.

After communication device A 200 has completed its communication, it requests to stop communicating by sending communication device B 200 a stop communications signal. Once communication device B 200 agrees, another countdown, represented by ΔT2 begins. After the second countdown expires, two way communication ends and the communication sub-band 220 goes quiet.

The stop communication signal may also be transmitted when insufficient quality of service, link quality, or signal strength is detected by a communication device 200 and/or network controller 300.

In some implementations, the devices, systems, and methods described here enable full duplex, wideband (>500 MHZ) communications within the same frequency at the same time through the use of STAR technology. High data rate (wide bandwidth), full duplex communication on the same frequency with almost no latency impact is a significant spectrum management and communications security improvements. Communications using STAR technology creates a fundamentally new approach to secure communications.

The technology discussed here may be used in the telecommunication abstraction layers defined by the International Organization for Standardization in their Open Sessions Connection (OSI) model.

Traditional communications systems have relied on various simplex (one user on a single frequency, channel or time slot at one time) methods for establishing, authenticating and maintaining communications. Since full duplex STAR communications set a new paradigm for the physical (base or first) layer of the OSI model, the existing methods and technologies for several of the other layers may become obsolete as the core assumption of simplex communication is no longer applicable.

The technology described here includes new physical and datalink initiation methodology for wideband simultaneous transmit and receive communications. The methodology is designed as a base abstraction layer of communications protocols for STAR as applied to static and mobile ad hoc network (MANET) communications between two or more STAR-enabled communication devices 200.

In some examples, the full duplex STAR communications over the communication sub-band 220 will not occupy more than 400 megahertz (MHz) of a 500 MHz wideband STAR system, or 900 MHz of a 1 gigahertz (GHz) STAR system. The remaining 100 MHz is not required as a guard band, but rather is employed as the signaling space (free space) for initiating secure physical and datalink initiation activity in the initiation sub-band 222.

Due to the deep self-interference suppression provided by the communication devices 200, the signals over the initiation 222 and communication 220 sub-bands may be contained within the background RF noise. This makes communications over the network 100 secure because they are extremely difficult to detect. The polling signals 224, interrogation signals 226, and authentication signals 228 may be power modulated to be just above or at the noise floor for the radio frequency environment that they occupy. If they were detected by a third party with conventional radio communication equipment, they would appear to be a spurious, short duration noise signal. Since they do not operate in the same frequencies as the communication sub-band, they could not be readily identified as a signal from a communication device 200.

This disclosure describes certain example embodiments, but not all possible embodiments of the devices, systems, and methods. Where a particular feature is disclosed in the context of a particular embodiment, that feature can also be used, to the extent possible, in combination with and/or in the context of other embodiments. The devices and associated methods may be embodied in many different forms and should not be construed as limited to only the embodiments described here.

That which is claimed is:

1. A communication method comprising facilitating a communication network between a plurality of communication devices having a transmit signal path and a receive signal path, the transmit signal path and receive signal path being operable to simultaneously transmit and receive at the same frequency over an interference-suppressed band, by:
generating a communication sub-band and an initiation sub-band within the interference-suppressed band, the initiation sub-band having a lower bandwidth than the communication sub-band;

executing a polling stage in which a first communication device transmits a polling signal within the initiation sub-band to a second communication device;

executing an interrogation stage in which the first communication device transmits an interrogation signal within the initiation sub-band to the second communication device;

executing an authenticating stage in which the first communication device transmits a timing signal to the second communication device; and executing a communication stage based on the timing signal in which the first and second communication devices communicate by transmitting and receiving simultaneously at the same frequency within the communication sub-band.

2. The communication method of claim 1, further comprising forming the interference-suppressed band by suppressing interference between the transmit signal path and receive signal path.

3. The communication method of claim 1, wherein the initiation sub-band operates at a lower power than the communications sub-band.

4. The communication method of claim 1, wherein the communication sub-band is at least 75% of a bandwidth of the interference-suppressed band.

5. The communication method of claim 1, wherein the initiation sub-band includes a first frequency range higher than the communication sub-band and a second frequency range lower than the communication sub-band.

6. The communication method of claim 1, further comprising, simultaneously at the same frequency in the initiation sub-band, transmitting a polling signal by the first communication device and receiving by the first communication device a polling signal from the second communication device.

7. The communication method of claim 1, wherein processing circuitry is configured to transmit and receive over the communication sub-band simultaneously at the same frequency.

8. The communication method of claim 1, wherein signals transmitted in the initiation sub-band are lower power than a baseline power of the communication sub-band.

* * * * *